United States Patent [19]

Iskenderian et al.

[11] Patent Number: 5,042,711

[45] Date of Patent: Aug. 27, 1991

[54] MULTI-GAUGE BONDINGS

[75] Inventors: Armenag Iskenderian, Westwood, Mass.; Roderick L. Dair, Hope Valley, R.I.; Paul A. Dion, North Attleboro, Mass.

[73] Assignee: Polymetallurgical Corporation, North Attleboro, Mass.

[21] Appl. No.: 282,997

[22] Filed: Dec. 2, 1988

Related U.S. Application Data

[63] Continuation of Ser. No. 64,578, Jun. 22, 1987, abandoned.

[51] Int. Cl.⁵ .............................................. B23K 20/04
[52] U.S. Cl. .................................... 228/235; 228/243; 228/158; 219/102; 428/600
[58] Field of Search .................... 428/600; 148/11.5 Q; 228/235, 243, 158; 72/160; 219/102, 107, 149, 78.02

[56] References Cited

U.S. PATENT DOCUMENTS

| | | | |
|---|---|---|---|
| 1,252,025 | 1/1918 | Ploehn | 228/151 |
| 1,915,084 | 6/1933 | Bonsall | 428/600 |
| 2,196,497 | 4/1940 | Heman | 228/151 |
| 2,306,792 | 12/1942 | Moore | 428/600 |
| 2,753,623 | 7/1956 | Boessenkool et al. | 228/243 |
| 2,809,422 | 10/1957 | Schultz | 228/243 |
| 3,078,563 | 2/1963 | Gould et al. | 228/243 |
| 3,265,277 | 8/1966 | Bacroix | 219/102 |
| 3,325,623 | 6/1967 | Briggs | 228/243 |
| 3,390,564 | 7/1968 | Syre | 228/243 |
| 3,488,989 | 1/1970 | Rakich et al. | 72/366 |
| 3,517,158 | 6/1970 | Briggs | 219/102 |
| 3,551,994 | 1/1971 | Newcomer | 228/243 |
| 3,619,546 | 11/1971 | Briggs | 219/102 |
| 3,737,979 | 6/1973 | Rakich et al. | 219/102 |
| 3,811,028 | 5/1974 | Henry et al. | 219/78.02 |
| 3,851,138 | 11/1974 | Metcalfe et al. | 219/78.02 |
| 4,241,146 | 12/1980 | Sivachenko | 428/600 |
| 4,377,732 | 3/1983 | Prelker | 228/158 |
| 4,593,549 | 6/1986 | Moriya et al. | 72/160 |
| 4,798,932 | 1/1989 | Dion et al. | 228/243 |

*Primary Examiner*—John J. Zimmerman
*Attorney, Agent, or Firm*—Samuels, Gauthier, Stevens & Kehoe

[57] ABSTRACT

A multi-gauge composite metal strip is produced from a plurality of individual metal strips of different thicknesses. The individual strips are heated, passed through an oxide reducing atmosphere and are then directed between a pair of work rolls with their adjacent edges arranged in a mutually overlapping relationship. The rolling action effects a reduction in the thickness of each strip while simultaneously effecting solid phase bonding of their overlapping edges. The resulting composite multi-gauge strip is subjected to tensile stresses which exceed the yield strength of the strip materials at the time and in the condition at which the composite strip exits from between the work rolls.

6 Claims, 2 Drawing Sheets

MULTI-GAUGE BONDINGS

This is a continuation of co-pending application Ser. No. 064,578 filed on June 22, 1987, now abandoned.

BACKGROUND OF THE INVENTION

1. Field of the Invention

This invention relates generally to the production of multi-gauge metal strips, and is concerned in particular with a method of producing such strips with one or more relatively thin web segments having width to thickness ratios greater than about 50 to 1.

2. Description of the Prior Art

Multi-gauge strips have been produced by a number of known methods, including for example continuous casting, continuous hot forging, continuous rolling, milling or machining, welding and extrusion.

A continuously cast product has a relatively rough surface and a low strength "as cast" crystal structure. Moreover, only one alloy can be continuously cast at a time, and then only at relatively slow speeds in the range of 8 to 60 inches per minute.

Continuous forging is also characterized by relatively low production speeds as well as poor accuracy, and the resulting products have relatively rough surfaces, making it necessary to resort to further machining in order to achieve desired surface finishes and tolerances.

Continuous rolling requires multiple roll passes, each having specially machined rolls. Intermediate annealing is usually required, and the resulting product in often plagued by non-uniform stresses which in turn result in distortions, e.g., twist and camber.

Milling or machining entails the cutting away or removal of metal, thereby producing considerable scrap. Production speeds are again relatively low, usually in the range of 4 to 8 feet per minute, this being due in large part to the necessity of avoiding excessive heat build up in the product as well as the cutters. The resulting product surface is also frequently mared by cutter striations.

Welding requires a high energy source to melt the metal and thereby cause fusion. Thickness variations are produced at the weld site, and the weld area is characterized by a relatively low strength as cast crystal structure. Moreover, the welds are subject to imperfections such as blow-holes and insufficient penetration. Welding rates rarely exceed 20 feet per minute, and insoluble material such as silver and nickel cannot be bonded by this technique.

Extrusion is limited to one metal or alloy at a time, and then only to those metals which have a low recrystallization temperature and a low modulus of elasticity, e.g., copper, silver and aluminum alloys. Metals which gaul e.g., nickel and the platinum group metals cannot be extruded.

Many of the foregoing difficulties are exacerbated as the width to thickness ratios of the thinnest sections of the desired end products increase. When this ratio exceeds about 50 to 1, it becomes virtually impossible to successfully produce an acceptable product on a commercial scale with any of the above-described conventional methods.

The production of composite strips by means of solid phase bonding is also known. However, difficulties stemming from differential rolling stresses and resulting curvature distortion have prevented this method from being employed successfully in the production of multi-gauge products with width to thickness ratios exceeding about 50 to 1.

A general objective of the present invention is to provide an improved method of producing a multi-gauge metal strip which avoids the above-described shortcomings and problems of the prior art.

SUMMARY OF THE INVENTION

In accordance with the present invention, at least two strips having different thicknesses and of the same or different metals are heated to a solid phase bonding temperature. The thus heated strips are next passed through an oxide reducing atmosphere before being guided in parallel alignment with their adjacent edges in an overlapping relationship into a roll pass defined by a pair of driven work rolls. The roll pass is configured to effect solid phase bonding of the overlapping strip edges while simultaneously reducing the thickness of each strip, thereby producing a composite strip exiting from the roll pass with a stepped cross section made up of at least two segments of different thicknesses. The resulting composite strip is immediately subjected to tensile stresses which exceed the yield strength of the strip material in the condition at which it exits from the roll pass.

DETAILED DESCRIPTION OF PREFERRED EMBODIMENT

Figures 1, 6, 7:
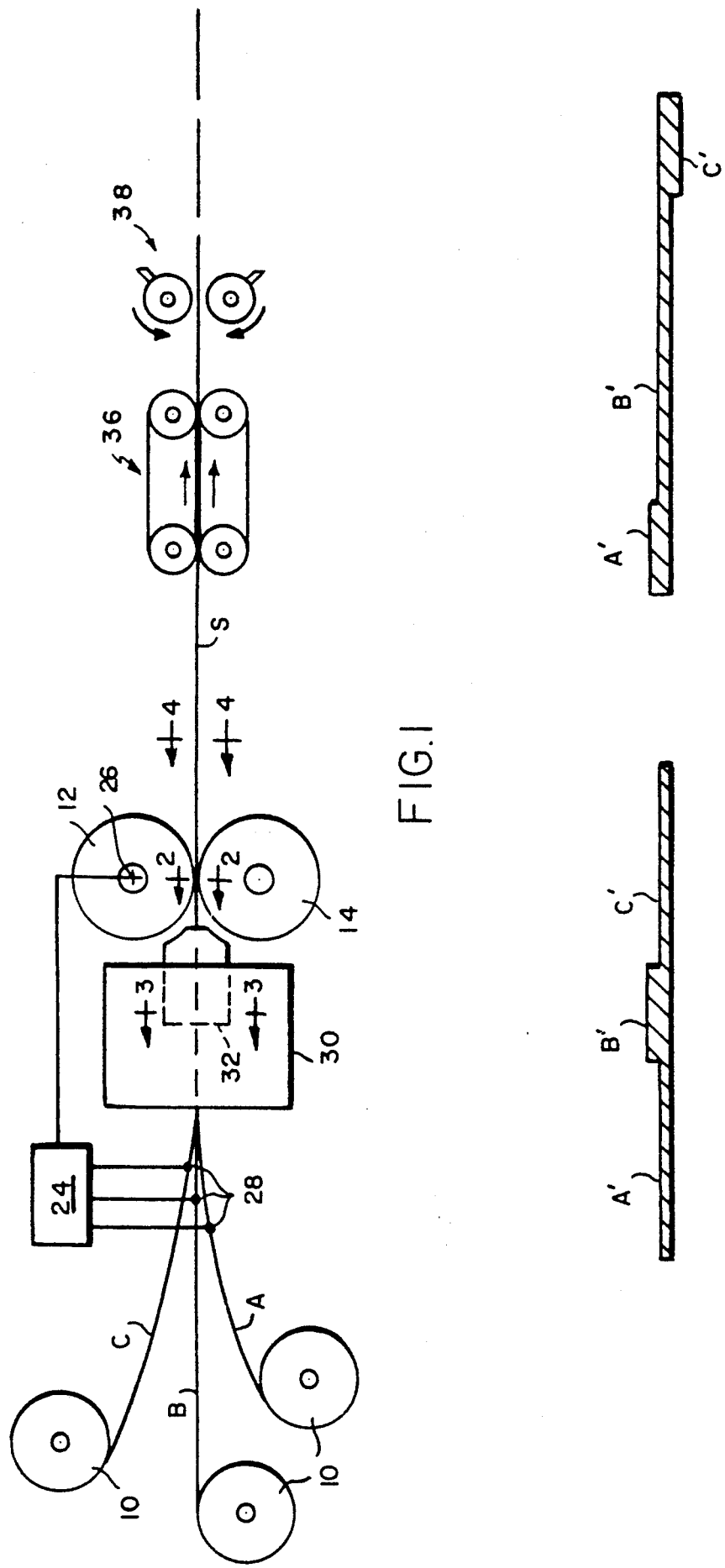
FIG. 1 is a diagrammatic illustration of a system for practicing the method of the present invention.
FIGS. 6 and 7 are sectional views showing other typical mutli-gauge composite strips of the type which can be produced with the method of the present invention.
Figure 2:
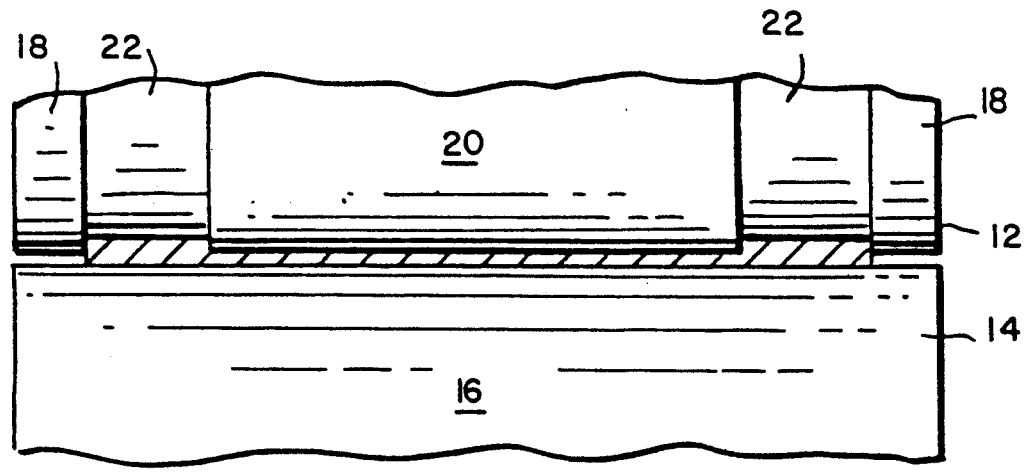
FIGS. 2, 3 and 4 are enlarged sectional views taken respectively along lines 2—2, 3—3, and 4—4 of FIG. 1.

Referring initially in FIG. 1, a plurality of individual metal strips A, B and C are unwound from storage reels 10 and are directed towards a single roll pass defined by a pair of work rolls 12, 14. The strips can comprise the same or different metals or alloys. High modulus metals such as steels can be employed, as can metals that gaul or metals that have high recrystallization temperatures. As can be best seen in FIG. 2, the lower roll 14 has a cylindrical surface 16, whereas the upper roll 12 has end collars 18 separated from a central barrel section 20 by grooves 22.

Figure 3:
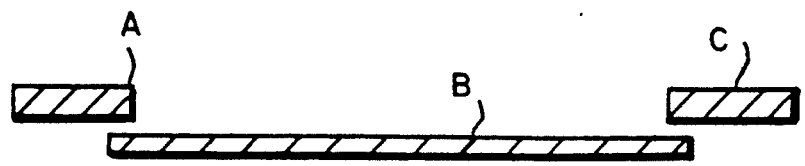

The individual strips A, B and C are initially heated to a solid phase bonding temperature by means of an electrical power source 24 connected as at 26 to one of the work rolls, and as at 28 by sliding or rolling contacts to each of the strips. The thus heated strips then enter a chamber 30 containing an oxide reducing atmosphere, e.g., hydrogen. A guide 32 then directs the strips from the chamber 30 into the roll pass. As shown in FIG. 3, the entering strips A, B and C are in parallel alignment, with their adjacent edges arranged in an overlapping relationship. In this particular embodiment the center strip B is thinner and wider than the two outboard strips A, C.

Figure 5:
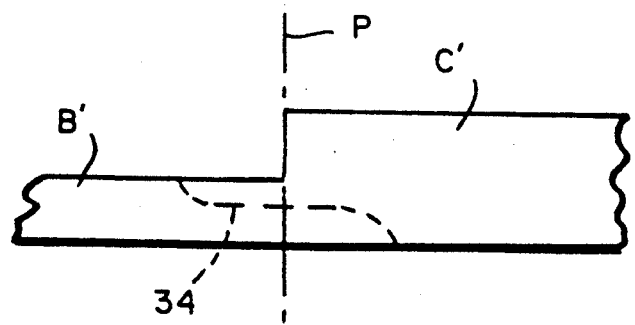
FIG. 5 is an enlarged view of a portion of FIG. 4 showing the bond interface between adjacent strips.

The thus aligned strips are rolled in the roll pass to effect a solid phase bonding of their overlapping edges while simultaneously reducing the thicknesses of the strips. The thus rolled strips exit from the roll pass as a composite multi-gauge strip S having a stepped cross section with three segments A', B' and C'. The center segment or web B' is thinner than the two outboard segments A', C' and has a width to thickness ratio greater than about 50 to 1. The bond interface between segments B' and C' is indicated in dotted at 34 in FIG. 5. This interface extends laterally from both sides of a reference plane P containing the steps, and provides a continuous secure joint between the segments. A similar but mirror image bond interface is created between segments A' and B'. The entire cross section has a wrought or cold work crystal structure which provides good strength and ductility.

A traction device 36 is employed to pull the composite strip S exiting from the roll pass. The pulling force subjects the composite strip to tensile stresses which exceed the yield strength of its materials at the time and elevated temperature condition at which they exit from the roll pass.

Because strips A, B and C of different cross sections are being bonded together to produce the desired end shape, non-uniform internal stresses are minimized and subsequently negated by the imposition of higher substantially uniform tensile stresses created by the pulling action of the traction device 36. Therefore, greater percentage thickness reductions may be effected at the areas of strip overlap in order to enhance solid phase bonding, without causing twist, camber or other like distortions.

After being subjected to tensile stresses by the traction device 36, the composite strip may be subdivided by a flying shear 38 or the like into discrete lengths. Alternatively, the composite strip may be accumulated in coil form on a take up reel (not shown).

Figure 4:

The following example illustrates the invention: three copper strips A, B and C were processed in accordance with the foregoing description. Each of the strips A, C had a width of 1.625" and at thickness of 0.200". The center strip B had a width of 2.085" and a thickness of 0.041". The strips were resistance heated to a temperature above 1000° F. and were then directed through a hydrogen atmosphere in chamber 30 before entering the roll pass in the condition illustrated in FIG. 3. During rolling, the strips were each reduced in thickness by between 30–50%, with the areas of edge overlap experiencing a larger percentage reduction in thickness of about 69%. Solid phase bonding was achieved at the areas of overlap. The cross sectional configuration of the resulting composite strip S was as shown in FIG. 4. Segments A' and C' had widths of 1.5" and thicknesses of 0.126", and the central web segment B' had a width of 2.0" and a thickness of 0.026", making its width to thickness ratio approximately 76.923.

The exiting composite strip was subjected to tensile stresses on the order of 20,000 psi before being subdivided into discrete lengths by a shear. The resulting composite strip lengths laid flat without twist, camber or other like distortions in any of the segments A', B' and C'.

The method of the present invention is not limited to the production of the composite strip shown in FIG. 4. Other and varied cross sectional configurations are possible. Thus, as shown in FIG. 6, the central web segment B' may be thicker than the side segment A', C'. Alternatively, as shown in FIG. 7, the side segments A', C' may protrude from opposite faces of the composite strip. These are but a few of the variations which are possible by solid phase bonding two or more metal strips in accordance with the present invention.

The present invention is capable of continuous operation at production rates as high as 40 feet per minute and perhaps higher. Bonding is effected and a finished shape is produced in a single roll pass, without resorting to additional process steps such as annealing, grinding, polishing, etc. The resulting surface finish is that of ground tool steel rolls, i.e., 20 micro-inch RMS or less. The bonded product has a wrought or cold work crystal structure which provides good strength and ductility without internal discontinuities and imperfections of the type which characterize welded products. As compared with conventional milling or machining methods, scrap is minimal, making it possible to achieve acceptable product yields of 90% or better. The present invention can produce strips with web segments having width to thickness ratios of greater than about 50 to 1, with extreme accuracy in shape location and reproducibility.

We claim:

1. A method of continuously producing a multi-gauge composite metal strip from at least two metal strips having different thicknesses, comprising:
    heating said metal strips to a solid phase bonding temperature;
    passing the thus heated strips through an oxide reducing atmosphere;
    guiding the strips from said oxide reducing atmosphere into a roll pass defined by a pair of work rolls, with the adjacent edges of said strips being arranged in a mutually overlapping relationship;
    rolling the strips in said roll pass to effect solid-phase bonding of said overlapping edges along a bond interface extending across a reference plane perpendicular to the planes of said strips while simultaneously reducing the thicknesses of said strips across their entire widths, with a maximum percentage thickness reduction being effected in said roll pass at the area of overlap of said adjacent edges, and with the thus rolled strips being formed into a composite strip exiting from said roll pass with a stepped cross-section having at least two segments of different thicknesses located on opposite sides of said reference plane.

2. The method of claim 1 wherein the width to thickness ratio of at least one of said segments is greater than about 50 to 1.

3. The method of claim 1 wherein said composite strip is rolled with one flat surface and one stepped surface.

4. The method of claim 1 further comprising subjecting the composite strip exiting from said roll pass to tensile stresses, and then subdividing the composite strip into discrete flat lengths.

5. The method of claim 4 wherein said tensile stresses exceed the yield strength of the composite strip material at the time and in the condition at which the composite strip exits from said roll pass.

6. The method of claim 5 wherein said tensile stresses are exerted by pulling said composite strip out of said roll pass.

* * * * *